United States Patent
Smart et al.

(10) Patent No.: US 9,204,243 B2
(45) Date of Patent: Dec. 1, 2015

(54) METHOD AND APPARATUS PERTAINING TO USE OF BLUETOOTH AND BLUETOOTH LOW ENERGY

(71) Applicant: Research In Motion Limited, Waterloo (CA)

(72) Inventors: Andrew Douglas Smart, San Jose, CA (US); Stephen Michael Coe, Ariss (CA); John Ivan Scharkov, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 208 days.

(21) Appl. No.: 13/833,326

(22) Filed: Mar. 15, 2013

(65) Prior Publication Data
US 2014/0274033 A1    Sep. 18, 2014

(51) Int. Cl.
H04B 5/00    (2006.01)
H04W 4/00    (2009.01)
H04M 1/60    (2006.01)
H04M 1/725   (2006.01)
H04W 52/02   (2009.01)

(52) U.S. Cl.
CPC ............ *H04W 4/008* (2013.01); *H04M 1/6075* (2013.01); *H04M 1/7253* (2013.01); *H04W 52/0251* (2013.01); H04M 2250/02 (2013.01)

(58) Field of Classification Search
None
See application file for complete search history.

(56) References Cited

U.S. PATENT DOCUMENTS

2011/0021142 A1* 1/2011 Desai et al. .................. 455/41.2
2012/0106658 A1* 5/2012 Muth et al. ................... 375/259
2012/0214417 A1  8/2012 Woo et al.

OTHER PUBLICATIONS

Bluetooth Specification Version 4.0 [vol. 0]; Master Table of Contents & Compliance Requirements; Jun. 30, 2010; 106 pages.
Bluetooth Specification Covered Core Package Version 4.0 [vol. 1]; Architecture & Terminology Overview; Jun. 30, 2010; 140 pages.
Bluetooth Specification Covered Core Package Version 4.0 [vol. 2]; Core System Package [BR/EDR Controller Volume]; Jun. 30, 2010; 1114 pages.
Bluetooth Specification Covered Core Package Version 4.0 [vol. 3]; Core System Package [Host volume]; Jun. 30, 2010; 656 pages.
Bluetooth Specification Covered Core Package Version 4.0 [vol. 4]; Host Controller Interface [Transport Layer]; Jun. 30, 2010; 88 pages.
Bluetooth Specification Covered Core Package Version 4.0 [vol. 5]; Core System Package [AMP Controller volume]; Jun. 30, 2010; 60 pages.
Bluetooth Specification Covered Core Package Version 4.0 [vol. 6]; Core System Package [Low Energy Controller volume]; Jun. 30, 2010; 138 pages.

* cited by examiner

*Primary Examiner* — Suhail Khan
(74) *Attorney, Agent, or Firm* — Jon Gibbons; Fleit Gibbons Gutman Bongini & Bianco P.L.

(57) ABSTRACT

Both Bluetooth-compatible and Bluetooth Low Energy-compatible transceivers are selectively used when supporting wireless communications between two electronic communication devices such as a so-called smartphone and a hands-free accessory. During a first operating state the devices use Bluetooth and during a second operating state the devices use Bluetooth Low Energy. By one approach the first operating state correlates to when a first one of the devices is actively engaged in telephony and the second operating state correlates to when that first device is not actively engaged in telephony.

12 Claims, 3 Drawing Sheets

METHOD AND APPARATUS PERTAINING TO USE OF BLUETOOTH AND BLUETOOTH LOW ENERGY

FIELD OF TECHNOLOGY

The present disclosure relates to electronic devices, including but not limited to portable electronic devices that support Bluetooth™-based communications.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations that are capable of wireless communications such as simple cellular telephones, so-called smartphones, wireless personal digital assistants (PDAs), and laptop computers with wireless 802.11 or Bluetooth capabilities.

Bluetooth refers to a very-short range (typically less than ten meters but sometimes effective up to thirty meters) two-way wireless communications protocol administered by the Bluetooth Special Interest Group and operating in the industrial, scientific, and medical (ISM) radio band. So-called classic Bluetooth refers to the protocol and specifications defined as IEEE Standard 802.15.1-2002 (the full contents of which are incorporated herein by this reference) with many later versions of Bluetooth (such as Bluetooth V2.0 and V3.0) being backwards compatible with that original standard.

Classic Bluetooth requires an established Bluetooth communication link to remain active even when the device is itself otherwise inactive. The standard does permit the Bluetooth link to assume one of three different sleep modes to help conserve battery power, but these modes do not permit sufficient battery conservation for all application settings. Bluetooth Low Energy is an alternative to the Bluetooth standard protocols introduced in versions V1.0 through V3.0 and requires an entirely new protocol stack that support very simple links. Bluetooth Low Energy is designed to support very-low power applications that run using small power sources such as a coin cell. The technical specifications and requirements for Bluetooth Low Energy appear in the published version of Bluetooth V4.0 as released by the aforementioned Bluetooth Special Interest Group, this publication also being fully incorporated herein by this reference.

Although Bluetooth Low Energy offers considerable power-savings opportunities as compared to classic Bluetooth (hereinafter simply referred to as "Bluetooth" when presented without further leading or trailing modifiers), Bluetooth Low Energy is considerably less functionally and bandwidth capable than Bluetooth. Bluetooth Low Energy, for example, will not readily support voice applications.

Generally speaking, when two paired devices are both Bluetooth compatible and Bluetooth Low Energy compatible, they will preferentially communicate with one another via Bluetooth Low Energy rather than Bluetooth. In the alternative, that preference can be switched in favor of Bluetooth instead of Bluetooth Low Energy.

DETAILED DESCRIPTION

Figure 1:
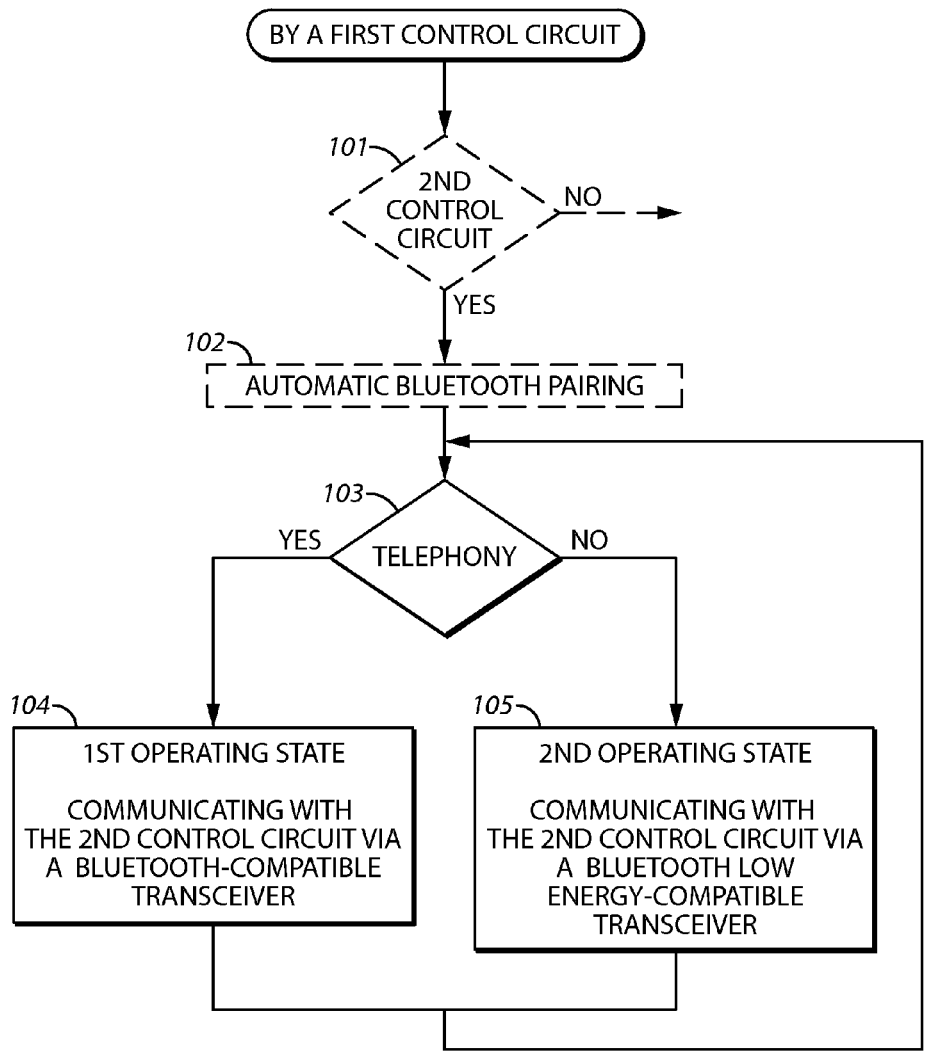
FIG. 1 is a flow diagram in accordance with the disclosure.

The following describes an apparatus and method pertaining to using both Bluetooth-compatible and Bluetooth Low Energy-compatible transceivers when supporting wireless communications between two electronic communication devices such as a so-called smartphone and a hands-free accessory. During a first operating state the devices use Bluetooth and during a second operating state the devices use Bluetooth Low Energy. By one approach the first operating state correlates to when a first one of the devices is actively engaged in telephony and the second operating state correlates to when that first device is not actively engaged in telephony.

So configured, a stand-alone accessory such as, for example, a battery-powered, visor-mounted, hands-free car-kit can be (and remain) actively paired to a corresponding smartphone using Bluetooth Low Energy during times when the smartphone is telephonically quiescent. When the smartphone sources or receives a telephone call, however, the two devices can switch to Bluetooth for the duration of the call to thereby facilitate hands-free support of that call by the car-kit. Using this approach, for most application settings where standby time greatly exceeds talk time the battery life of the hands-free car-kit can be greatly extended as compared to pairings that rely only on Bluetooth.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that comports with many of the present teachings. For the sake of an illustrative example it will be presumed here that a first control circuit of choice carries out this process 100. Further details will be provided further herein regarding this first control circuit.

This description will also presume the presence of a second control circuit that is logically and physically separate from the first control circuit. Again, further details will be provided further herein regarding this second control circuit.

It will be noted here, however, that by one optional approach this process 100 provides for detecting (at 101) that presence of the second control circuit (using, for example, a Bluetooth-compatible detection methodology) and responsively automatically pairing (at 102) with the second control circuit using the Bluetooth pairing protocol. (In the absence of detecting the second control circuit at 101 this process 100 can accommodate any of a variety of responses. Examples of responses in these regards can include temporal multitasking (pursuant to which the first control circuit conducts other tasks before returning to again monitor for the second control circuit) as well as continually looping back to essentially continuously monitor for the second control circuit. These teachings also accommodate supporting this detection activity via a real-time interrupt capability if desired.)

The Bluetooth-based pairing can be configured to require the active participation of the user, if desired. For many application settings, however, it may best serve if the pairing occurs automatically. Because Bluetooth and Bluetooth Low Energy have different pairing processes with separate linkkeys it may be desirable to employ a suitable out-of-band pairing process to avoid needing multiple pairing events (similar, for example, to the tap pairing approach used in Near Field Communications (NFC)). In any event, Bluetooth detection and pairing comprises a well-understood area of prior art endeavor. Accordingly, further elaboration will not be provided here for the sake of brevity.

At 103 the first control circuit determines the state of a particular monitored condition and/or capability. For the sake of an illustrative example, that condition/capability is presumed here to refer to telephony. In particular, this determination can comprise determining whether a monitored personal telephony device (of which the first control circuit may comprise a part) is actively engaged in telephony or is not actively engaged in telephony. (As used herein, "telephony" shall be understood to refer to telephone-styled two-way voice communications including both wireless and non-wireless communications of this sort.)

When the monitored condition/capability reveals a first operating state (such as, for example, that the monitored personal telephony device is actively engaged in telephony), at 104 the first control circuit communicates with the second control circuit via a Bluetooth-compatible transceiver. When the monitored condition/capability reveals instead a second operating state (that is different than the first operating state and which may comprise an opposite operating state in comparison to the first operating state), at 105 the first control circuit communicates with the second control circuit via a Bluetooth Low Energy-compatible transceiver instead of the Bluetooth-compatible transceiver. The first control circuit can then continue to monitor that predetermined condition/capability to determine whether to persist an existing communication methodology as described above or to switch to a different communication methodology per the foregoing description.

When the first control circuit comprises a part of a personal wireless telephony device and the second control circuit comprises a part of a hands-free wireless accessory such as a car-kit, this process 100 permits the latter to utilize a very low power approach to maintaining a linked connection between the two platforms. When a user employs the personal wireless telephony device to conduct a call, however, this process 100 allows the first control circuit to switch to a non-Bluetooth Low Energy approach (such as classic Bluetooth) when communicating with the accessory to thereby support activities such as the transmission of voice content back and forth between the personal wireless telephony device and the accessory. This voice content can comprise, for example, received voice that the personal wireless telephony device provides to the accessory for the accessory to render audible via a speaker as well as voice content the accessory captures from the user via a microphone and which the accessory provides to the personal wireless telephony device to transmit as part of the call.

The frequency by which the first control circuit makes the determination at 103 can vary to some extent with the application setting. For many application settings a frequency of about fifty to sixty microseconds will likely provide adequate performance in these regards.

Figure 2:
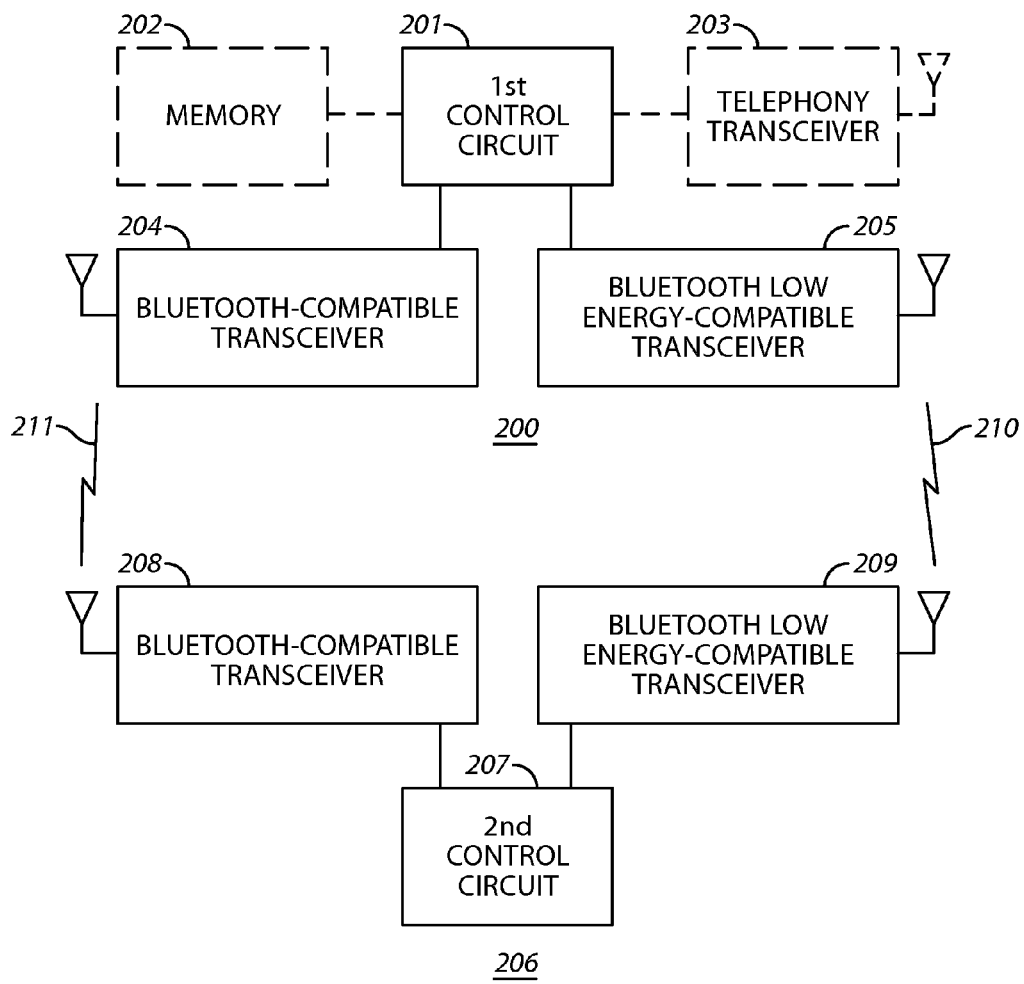
FIG. 2 is a block diagram in accordance with the disclosure.

FIG. 2 presents an illustrative example of an electronic device 200 having the aforementioned first control circuit 201. Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

By one optional approach this control circuit 201 operably couples to a memory 202. The memory 202 may be integral to the control circuit 201 or can be physically discrete (in whole or in part) from the control circuit 201 as desired. This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Also if desired, the first control circuit 201 can operably couple to an optional telephony transceiver 203. Various transceivers are known in these regards and include, for example, CDMA2000-compatible transceivers, Global System for Mobile Communications (GSM)-compatible transceivers, and so forth. Such transceivers are very well known in the art. As the present teachings are not overly sensitive to any particular choices made as amongst the available choices, further elaboration will not be provided here in these regards.

The first control circuit 201 also operably couples to a Bluetooth-compatible transceiver 204 and a Bluetooth Low Energy-compatible transceiver 205. The present teachings are highly flexible in these regards. By one approach these two transceivers 204 and 205 can be logically and physically discrete from one another. By another approach, as when using a so-called dual-mode transceiver, a single transceiver can be configured to selectively serve in the alternative as one or the other type of transceiver.

So configured, the first control circuit 201 can monitor the telephony status of the telephony transceiver 203 and can responsively switch (as per the description provided above) between use of the Bluetooth-compatible transceiver 204 and the Bluetooth Low Energy compatible transceiver 205 while remaining paired with a second control circuit 207 as comprises a part of a separate electronic device 206 (such as, but certainly not limited to, a hands-free communication accessory such as a visor-mounted hands-free car-kit as are known in the art).

To facilitate the switching between these communication approaches by the first control circuit 201, this second control circuit 207 is operably coupled to and has similar access to its own on-board Bluetooth-compatible transceiver 208 and Bluetooth Low Energy-compatible transceiver 209 (which again may be physically separate from one another or may, if desired, share a common platform such as a shared integrated circuit). By one approach, for example, the second control circuit 207 can be configured to respond to specific commands from the first control circuit 201 regarding which transceiver 208 and 209 to employ and when.

For example, when using the Bluetooth Low Energy-compatible transceiver 209 to communicate with the first control circuit 201, the latter can issue a command via a Bluetooth Low Energy communication 210 that the second control circuit 207 now (or at some predetermined future point in time) switch to using the Bluetooth-compatible transceiver 208 to communicate with the first control circuit 201. Similarly, the first control circuit 201 could issue a command via a Bluetooth communication 211 that the second control circuit 207 switch from the Bluetooth-compatible transceiver 208 to the Bluetooth Low Energy-compatible transceiver 209.

These teachings will accommodate other approaches in these regards as well. For example, upon first pairing with one another, both control circuits 201 and 207 can be configured to initially use their Bluetooth Low Energy-compatible transceivers 205 and 209 until the first control circuit 201 instructs the second control circuit 207 to switch to the Bluetooth-compatible transceiver 208 per the foregoing description.

In any event, it will be understood and appreciated that these teachings permit two devices to communicate with one another during the course of a single pairing using both Bluetooth and Bluetooth Low Energy at different times depending upon the operating state of one of them. Though a switched use back and forth of these two incompatible protocols by two devices that are both able to accommodate either differs from ordinary practice in these regards, the applicant has determined that such an approach can nevertheless serve well to greatly improve battery life for one or both of the devices while also ensuring adequate performance at times of need.

Figure 3:
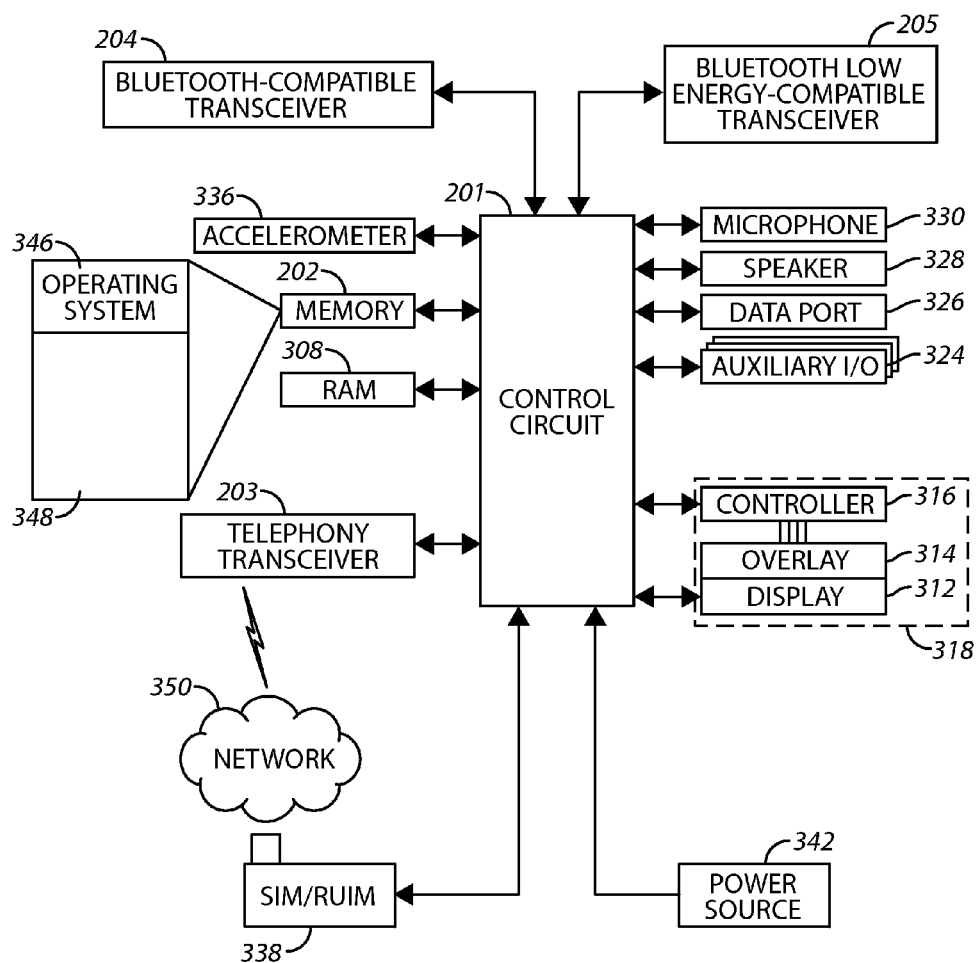
FIG. 3 is a block diagram in accordance with the disclosure.

As noted above, by one approach the aforementioned first control circuit 201 can comprise a part of a portable wireless telephony device. Referring now to FIG. 3, an exemplary portable communication device in these regards includes such a control circuit 201 to controls the overall operation of the portable electronic device. Corresponding telephony functions, including data and voice communications, are performed through a telephony transceiver 203. The telephony transceiver 203 supports calls via a wireless network 350.

In this illustrative example the wireless network 350 comprises a wireless telephony network (which may support data communications in addition to voice communications if desired). To identify a subscriber for network access, the portable communication device may utilize a Subscriber Identity Module or a Removable User Identity Module (SIM/RUIM) card 338 for communication with a network, such as the wireless network 350. Alternatively, user identification information may be programmed into a memory 310. In addition, the control circuit 201 also operably couples to the aforementioned Bluetooth-compatible transceiver 204 and the Bluetooth Low Energy compatible transceiver 205.

A power source 342, such as one or more rechargeable batteries or a port to an external power supply, powers the electronic device. The control circuit 201 may interact with an accelerometer 336 that may be utilized to detect direction of gravitational forces or gravity-induced reaction forces. The control circuit 201 also interacts with a variety of other components, such as a Random Access Memory (RAM) 308, the aforementioned memory 202, an auxiliary input/output (I/O) subsystem 324, a data port 326, a speaker 328, a microphone 330, and other device subsystems of choice.

A display 312 can be disposed in conjunction with a touch-sensitive overlay 314 that operably couples to an electronic controller 316. Together these components can comprise a touch-sensitive display 318 that serves as a graphical-user interface. Information, such as text, characters, symbols, images, icons, and other items may be displayed on the touch-sensitive display 318 via the control circuit 201.

The portable communication device includes an operating system 346 and software programs, applications, or components 348 that are executed by the control circuit 201 and are typically stored in a persistent, updatable store such as the memory 202. Additional applications or programs may be loaded onto the portable communication device through the wireless network 350, the data port 326, or even via the Bluetooth-compatible transceiver 204 or the Bluetooth Low Energy-compatible transceiver 205.

As a communication device, a received signal such as a text message, an e-mail message, or web page download can be input to the control circuit 201. The control circuit 201 processes the received signal for output to the display 312 and/or to the auxiliary I/O subsystem 324. A user may generate data items, for example e-mail messages, that may be transmitted over the wireless network 350 through the communication subsystem. For voice communications, the overall operation of the portable electronic device is similar. The speaker 328 outputs audible information converted from electrical signals, and the microphone 330 converts audible information into electrical signals for processing (unless, of course, the control circuit 201 is utilizing the Bluetooth-compatible transceiver 204 to facilitate audio input/output functionality via an accessory such as a wireless hands-free headset, car-kit, or the like).

Accordingly, it will be appreciated that the present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A method comprising:
   by a first control circuit as part of a personal telephony device having local access to both a Bluetooth-compatible transceiver and a Bluetooth Low Energy-compatible transceiver:
   during a first operating state communicating with a second control circuit via the Bluetooth-compatible transceiver, the personal telephony device configured to operate in the first operating state when actively engaged in two-way voice telephony communications; and
   during a second operating state, automatically switching from communicating with the second control circuit via the Bluetooth-compatible transceiver to communicating with the second control circuit via the Bluetooth Low Energy-compatible transceiver; such that the first control circuit uses both the Bluetooth-compatible transceiver and the Bluetooth Low Energy-compatible transceiver when communicating with the second control circuit but not in an overlapping manner, the personal telephony device configured to operate in the second operating state when not actively engaged in two-way voice telephony communications.

2. The method of claim 1 further comprising:
   detecting when the personal telephony device becomes actively engaged in telephony and responsively switching from the Bluetooth Low Energy-compatible transceiver to the Bluetooth-compatible transceiver when communicating with the second control circuit.

3. The method of claim 2 further comprising:
   detecting when the personal telephony device ceases active engagement in telephony and responsively switching from the Bluetooth-compatible transceiver to the Bluetooth Low Energy-compatible transceiver when communicating with the second control circuit.

4. The method of claim 1 wherein the first control circuit and the second control circuit are Bluetooth paired and configured to automatically connect to one another when within range of one another.

5. An apparatus comprising:
a Bluetooth-compatible transceiver;
a Bluetooth Low Energy-compatible transceiver;
a first control circuit operably coupled to the Bluetooth-compatible transceiver and the Bluetooth Low Energy-compatible transceiver as part of personal telephony device, the first control circuit being configured to:
during a first operating state communicating with a second control circuit via the Bluetooth-compatible transceiver, the personal telephony device is configured to operate in the first operating state when actively engaged in two-way voice telephony communications; and
during a second operating state, automatically switching from communicating with the second control circuit via the Bluetooth-compatible transceiver to communicating with the second control circuit via the Bluetooth Low Energy-compatible transceiver;
such that the first control circuit uses both the Bluetooth-compatible transceiver and the Bluetooth Low Energy-compatible transceiver when communicating with the second control circuit but not in an overlapping manner, the personal telephony device is configured to operate in the second operating state when not actively engaged in two-way voice telephony communications.

6. The apparatus of claim 5 wherein the first control circuit is further configured to:
detect when the personal telephony device becomes actively engaged in telephony and responsively switch from the Bluetooth Low Energy-compatible transceiver to the Bluetooth-compatible transceiver when communicating with the second control circuit.

7. The apparatus of claim 6 wherein the first control circuit is further configured to:
detect when the personal telephony device ceases active engagement in telephony and responsively switch from the Bluetooth-compatible transceiver to the Bluetooth Low Energy compatible transceiver when communicating with the second control circuit.

8. The apparatus of claim 5 wherein the first control circuit is Bluetooth paired to the second control circuit and is further configured to automatically connect to the second control circuit when within Bluetooth range of the second control circuit.

9. A non-transitory computer readable medium for operating a first control circuit and a second control circuit and as part of a personal telephony device having local access to both a Bluetooth-compatible transceiver and a Bluetooth Low Energy-compatible transceiver, the non-transitory computer readable medium having stored thereon computer executable instructions for:
during a first operating state communicating with the second control circuit via the Bluetooth-compatible transceiver, the personal telephony device configured to operate in the first operating state when actively engaged in two-way voice telephony communications; and
during a second operating state, automatically switching from communicating with the second control circuit via the Bluetooth-compatible transceiver to communicating with the second control circuit via the Bluetooth Low Energy-compatible transceiver; such that the first control circuit uses both the Bluetooth-compatible transceiver and the Bluetooth Low Energy-compatible transceiver when communicating with the second control circuit but not in an overlapping manner, the personal telephony device configured to operate in the second operating state when not actively engaged in two-way voice telephony communications.

10. The non-transitory computer readable medium of claim 9 further comprising:
detecting when the personal telephony device becomes actively engaged in telephony and responsively switching from the Bluetooth Low Energy-compatible transceiver to the Bluetooth-compatible transceiver when communicating with the second control circuit.

11. The non-transitory computer readable medium of claim 9 further comprising:
detecting when the personal telephony device ceases active engagement in telephony and responsively switching from the Bluetooth-compatible transceiver to the Bluetooth Low Energy-compatible transceiver when communicating with the second control circuit.

12. The non-transitory computer readable medium of claim 9 wherein the first control circuit and the second control circuit are Bluetooth paired and configured to automatically connect to one another when within range of one another.

* * * * *